(12) United States Patent
McKay et al.

(10) Patent No.: US 9,914,866 B2
(45) Date of Patent: Mar. 13, 2018

(54) PERCOLATED MICROSTRUCTURES FOR MULTI-MODAL TRANSPORT ENHANCEMENT IN POROUS ACTIVE MATERIALS

(71) Applicant: Massachusetts Institute of Technology, Cambridge, MA (US)

(72) Inventors: Ian Salmon McKay, Seattle, WA (US); Sungwoo Yang, Chelsea, MA (US); Evelyn N. Wang, Cambridge, MA (US); Hyunho Kim, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/540,164

(22) Filed: Nov. 13, 2014

(65) Prior Publication Data
US 2015/0132565 A1    May 14, 2015

Related U.S. Application Data

(60) Provisional application No. 61/903,558, filed on Nov. 13, 2013.

(51) Int. Cl.
*H01B 1/04*        (2006.01)
*H01B 13/30*       (2006.01)
*C09K 5/14*        (2006.01)
*C01B 32/186*      (2017.01)

(52) U.S. Cl.
CPC .............. *C09K 5/14* (2013.01); *C01B 32/186* (2017.08); *H01B 1/04* (2013.01); *Y10T 428/24997* (2015.04); *Y10T 428/249967* (2015.04)

(58) Field of Classification Search
None
See application file for complete search history.

(56) References Cited

U.S. PATENT DOCUMENTS

| | | | | |
|---|---|---|---|---|
| 5,004,710 A | * | 4/1991 | Anderson | B82Y 30/00 423/6 |
| 5,945,211 A | * | 8/1999 | Yamaguchi | A61L 2/16 427/180 |
| 2001/0045408 A1 | * | 11/2001 | Takeda | H01P 11/006 216/41 |

(Continued)

OTHER PUBLICATIONS

International Searching Authority, International Search Report—International Application No. PCT/US2014/065365, dated Feb. 12, 2015, together with the Written Opinion of the International Searching Authority, 13 pages.

(Continued)

*Primary Examiner* — Lisha Jiang
(74) *Attorney, Agent, or Firm* — Sunstein Kann Murphy & Timbers LLP (57) ABSTRACT

A method of forming a composite material for use in multi-modal transport includes providing three-dimensional graphene having hollow channels, enabling a polymer to wick into the hollow channels of the three-dimensional graphene, curing the polymer to form a cured three-dimensional graphene, adding an active material to the cured three-dimensional graphene to form a composite material, and removing the polymer from within the hollow channels. A composite material formed according to the method is also provided.

14 Claims, 6 Drawing Sheets

(56) References Cited

U.S. PATENT DOCUMENTS

| | | |
|---|---|---|
| 2006/0115640 A1 | 6/2006 | Yodh et al. |
| 2009/0142648 A1* | 6/2009 | Kohl .................. H01M 4/92 429/406 |
| 2011/0160039 A1* | 6/2011 | Himeno ............... B01J 29/70 502/4 |
| 2012/0009381 A1 | 1/2012 | Zhang et al. |
| 2012/0103900 A1* | 5/2012 | Bhave ................. G21F 9/125 210/643 |
| 2012/0234694 A1* | 9/2012 | Vecitis ............. B01D 39/2055 205/747 |
| 2013/0192461 A1* | 8/2013 | Miller ............. B01D 67/0039 95/47 |

OTHER PUBLICATIONS

Chen et al., "Three-dimensional flexible and conductive interconnected graphene networks grown by chemical vapour deposition," Nature Materials, vol. 10, pp. 424-428, Apr. 10, 2011.

Masika et al., "Preparation of ultrahigh surface area porous carbons templated using zeolite 13X for enhanced hydrogen storage," Progress in Natural Science: Materials International, vol. 23, No. 3, pp. 308-316, May 17, 2013.

\* cited by examiner

PERCOLATED MICROSTRUCTURES FOR MULTI-MODAL TRANSPORT ENHANCEMENT IN POROUS ACTIVE MATERIALS

CROSS-REFERENCE TO RELATED APPLICATIONS

This patent application claims the benefit of U.S. Provisional Patent Application No. 61/903,558 filed Nov. 13, 2013, the disclosure of which is incorporated by reference herein in its entirety.

STATEMENT REGARDING FEDERALLY SPONSORED RESEARCH OR DEVELOPMENT

This invention was made with Government support under Grant No. DE-AR0000185 awarded by the Department of Energy. The Government has certain rights in the invention.

TECHNICAL FIELD

The present invention relates to microstructures for multi-modal transport, and more specifically to microstructures that enhance multi-modal transport in porous active materials.

BACKGROUND ART

Many engineered systems utilize active materials in which transport must occur concurrently in two different modes. In thermochemical systems, such as adsorption heat pumps, the active material must simultaneously support both vapor and heat transport. In electrochemical systems, such as battery electrodes, the active material must support both electron and ion transport. Both of these transport modes are equally critical, and both must be optimized for effective device operation. However, enhancement of one transport mode typically degrades the other mode. For example, in adsorption systems, the high macropore volume required for effective mass transport increases the tortuosity of the heat transport path, degrading the bulk thermal conductivity of the material. One typical approach to solving this problem is to mix in a low-volume additive of non-active material that enhances one transport mode while hindering the other as little as possible. For example, graphite flakes are added to powdered $MnO_2$ cathode material of alkaline batteries to increase the electrical conductivity of the material while blocking ion transport as little as possible. In adsorption systems, ceramic binders have been used to similarly enhance the thermal transport while limiting the impact on vapor transport. However, common features of these and all similar solutions are 1) enhancement of only one transport mode, and slight degradation of the other, and 2) a reduction in the overall active material density due to the added fraction (typically about 5-20%) of non-active material.

SUMMARY OF EMBODIMENTS

In accordance with one embodiment of the invention, a method of forming a composite material for use in multi-modal transport includes providing three-dimensional graphene having hollow channels, enabling a polymer to wick into the hollow channels of the three-dimensional graphene, curing the polymer to form a cured three-dimensional graphene, adding an active material to the cured three-dimensional graphene to form a composite material, and removing the polymer from within the hollow channels.

In accordance with another embodiment of the invention, a method of forming a composite material for use in multi-modal transport includes providing a three-dimensional network of vapor transport channels, enabling a polymer to enter into the vapor transport channels, curing the polymer to form a cured three-dimensional network, adding an active material to the cured three-dimensional network to form a composite material, and removing the polymer from within the vapor transport channels.

In some embodiments, the polymer may include polymethylmethacrylate (PMMA). The active material may include zeolite, for example, zeolite 13x. The active material may be a powder within a liquid suspension and adding the active material to the cured three-dimensional graphene may include integrating the suspension within open areas around the hollow channels. The method may further include wetting the cured three-dimensional graphene with an integration promoter before adding the active material in order to promote integration of the active material within the cured three-dimensional graphene. When the active material includes zeolite, the integration promoter may include ethanol. The method may further include densifying the composite material before removing the polymer from within the hollow channels. Removing the polymer may include immersing the composite material in a solvent. When the polymer includes polymethylmethacrylate, the solvent may include acetone. The method may further include annealing the composite material after removing the polymer from within the hollow channels in order to promote contact between the active material and the three-dimensional graphene. The steps of enabling and curing may be repeated in order to substantially fill the hollow channels with the polymer. Enabling the polymer to wick into the hollow channels may include placing one side of the three-dimensional graphene in the polymer and permitting the polymer to enter the hollow channels by capillary action. The three-dimensional network may be a microporous fin made of a metal or alloy, such as copper or aluminum, or made of carbon paper or carbon cloth. Adding the active material to the cured three-dimensional network may include placing a layer of the active material on either side of the cured three-dimensional network. A composite material may be formed according to embodiments of the present invention.

BRIEF DESCRIPTION OF THE DRAWINGS

The foregoing features of the invention will be more readily understood by reference to the following detailed description, taken with reference to the accompanying drawings, in which.

DESCRIPTION OF ILLUSTRATIVE EMBODIMENTS

Embodiments of the present invention provide low additive fraction (e.g., <<10%) binders that enhance both modes of transport simultaneously, allowing for maximum density packing and most complete utilization of active material in the common case where two modes of transport are co-limiting. In addition to increasing the rate at which processes can be carried out in the active material, embodiments of the present invention also increase the maximum packing density of porous active materials by creating crush-resistant transport channels that can maintain both transfer modes even as the bulk material porosity is reduced. In a preferred embodiment, three-dimensional networks of defect-rich graphene tubes are incorporated into compressed zeolite 13x adsorbent material, improving both the bulk vapor and heat transport characteristics of the zeolite. While the below description focuses on simultaneous enhancement of heat and mass transport in mesoporous adsorbent materials, embodiments may be equally applicable to a range of other systems and processes that require optimized multi-modal transport to and from active materials, as known by one skilled in the art. Details of illustrative embodiments are discussed below.

Figure 1:
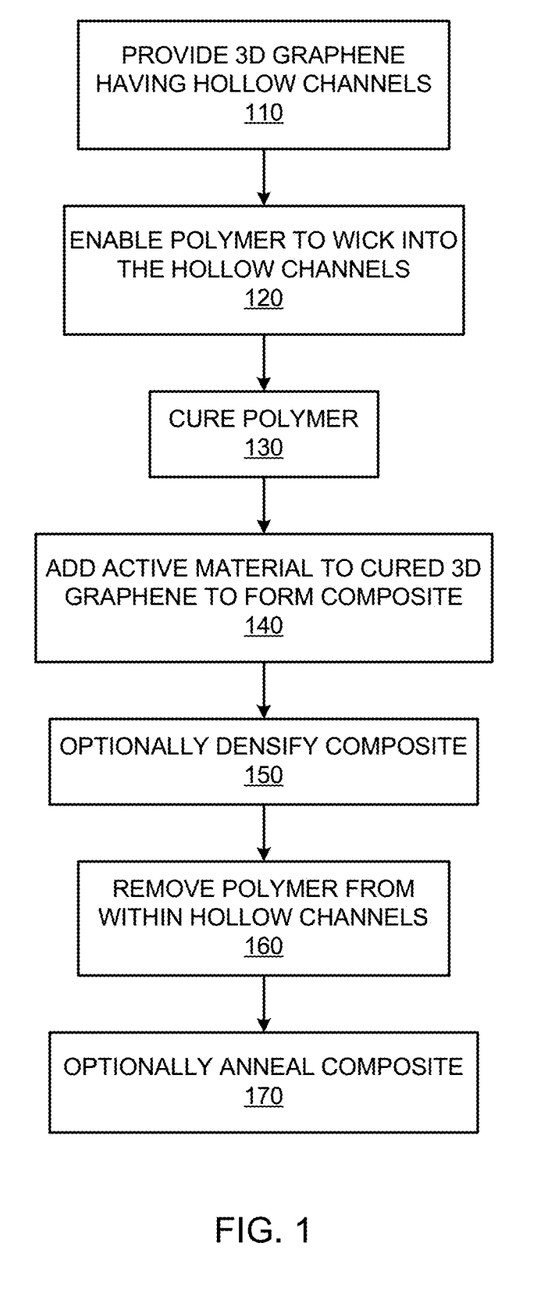
FIG. 1 is a flow chart showing a method of forming a composite material for use in multi-modal transport according to embodiments of the present invention.
Figure 2A:
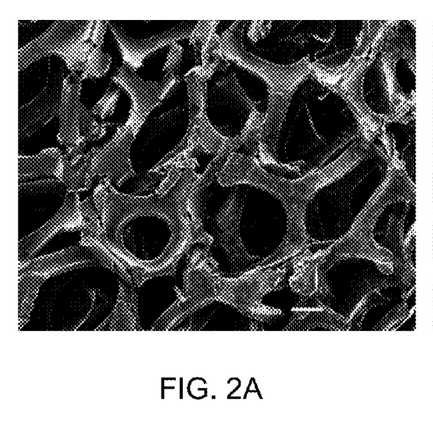
FIGS. 2A and 2B are scanning electron micrographs showing hollow graphene tubes and the graphene tube wall, respectively, according to embodiments of the present invention.
Figure 2B:
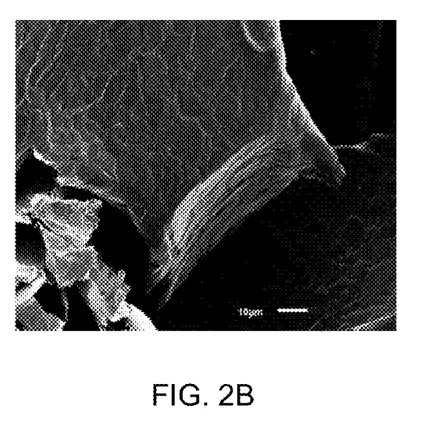

FIG. 1 is a flow chart showing a method of forming a composite material for use in multi-modal transport according to embodiments of the present invention. In step 110, three-dimensional graphene having hollow channels is provided. The three-dimensional graphene may be formed by any method known to one skilled in the art. For example, Z. Chen et al. in *Three Dimensional Flexible and Conductive Interconnected Graphene Networks Grown by Chemical Vapor Deposition.* Nature Mater., 10 (2011), pp. 424-428 discloses one method of forming three-dimensional graphene, which is incorporated by reference herein in its entirety. In one embodiment, graphene is synthesized on three-dimensional open-cell Ni foam (e.g., having about 98% porosity). The Ni foam is then etched away, leaving a three-dimensional, interconnected carbon network composed of hollow channels. FIGS. 2A and 2B show hollow graphene tubes and the graphene tube walls, respectively, formed by this method, after the Ni etch step, but before the wicking step or active material integration step (discussed in more detail below). Preferably, high defect density in the graphene tube walls should be used in order to ensure mass transport between the tube interior and the bulk active material.

In step 120, a polymer wicks into the interior of the hollow channels and is then cured in step 130. Preferably, the polymer is polymethylmethacrylate (PMMA), although other polymers may be used to provide a crush resistant material within the hollow channels. The wicking and curing may be performed several times, e.g., 1-5 times, in order to substantially fill the inside of the graphene tubes.

In step 140, active material is added to the cured three-dimensional graphene structure in order to form a composite material. For example, the active material may be a porous, absorbent material, such as zeolite (e.g., zeolite 13x) in thermochemical system applications that require heat and mass transport. Alternatively, the active material may be lithium cobalt oxide ($LiCoO_2$) or may be manganese oxide, e.g., $Mn_2O_3$, in electrochemical system applications. Other active materials may also be used that are commonly used in electrochemical systems or thermochemical systems that would benefit from open channels within the material. The active material may be in the form of a powder within a liquid suspension. The active material may be poured or pressed into the cured three-dimensional graphene structure in order to integrate the active material within open areas around the hollow channels. A wetting agent or integration promoter may be used, before the active material is added, in order to promote the uptake and integration of the active material within the cured three-dimensional graphene structure. For example, when the active material includes zeolite, the wetting agent may be ethanol. For other active materials, the filling process might be different.

Figure 3A:
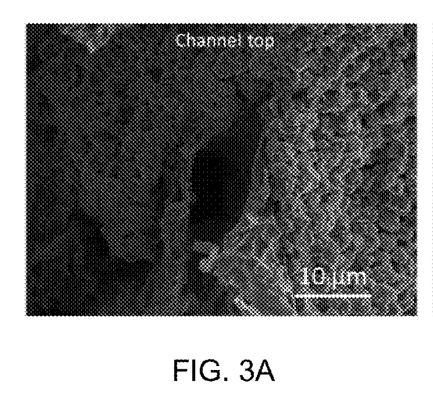
FIGS. 3A and 3B are scanning electron micrographs showing hollow graphene tubes after integration into zeolite material and removal of PMMA with its open channel structure according to embodiments of the present invention.
Figure 3B:
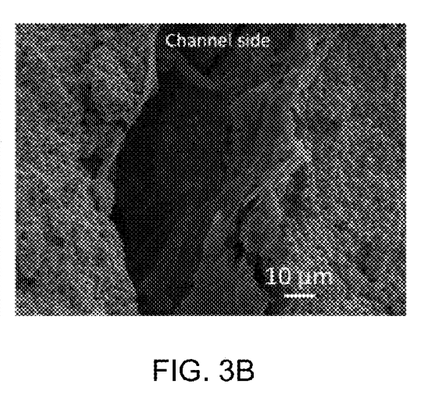

In step 150, the composite material may optionally be subjected to a densification process. For example, the composite material may be compressed in order to increase the density of the porous, absorbent material, such as zeolite. In step 160, the polymer is removed from the inside of the hollow channels. For example, the composite material may be immersed in a solvent that dissolves the polymer. In one preferred embodiment, the polymer is PMMA and the solvent includes acetone. FIGS. 3A and 3B show hollow graphene tubes after integration into zeolite material and removal of PMMA showing the open channel structure left in the compressed three-dimensional graphene-zeolite samples. When the cured network was filled with zeolite material, the interconnected network of hollow tubes enhanced both heat and mass transport within the zeolite.

In step 170, the composite material may optionally be annealed in order to promote contact between the active material and the three-dimensional graphene. For example, the annealing process may shrink the three-dimensional graphene into the zeolite improving the contact between the two materials in the composite material. The annealing process may also increase the defect density of the graphene, which helps molecules or ions move from within the hollow channel to the active material and vice versa, improving the mass transfer within the composite material. Preferably, a three-dimensional graphene-zeolite composite material may be annealed at about 450° C. for about 3 hours in an inert gas. Varying the annealing time can help tailor the defect density of the graphene and adjust the amount that the three-dimensional graphene shrinks onto the active material.

Although the discussion above discloses etching away the Ni template for growing the three-dimensional graphene structure prior to the addition of the active material and the optional densification process, the Ni template may also be etched away after the addition and densification steps.

Figures 4A, 4B:
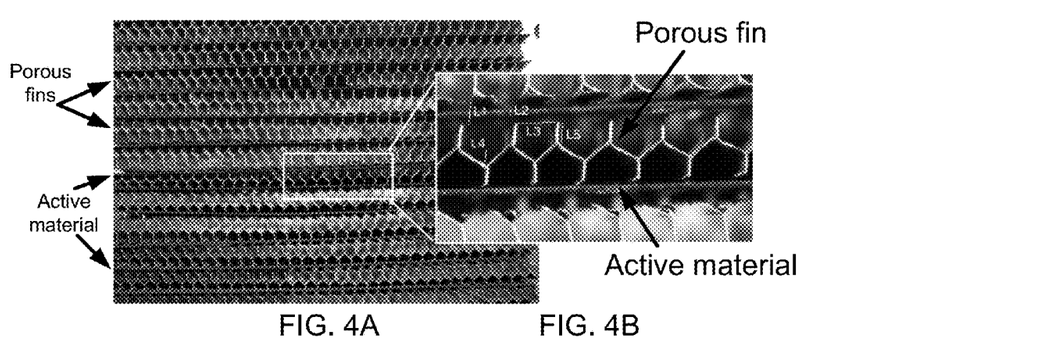
FIGS. 4A and 4B are photomicrographs showing microporous fins inserted vertically into an aluminum honeycomb-reinforced adsorbent bed according to embodiments of the present invention.

In another embodiment of the present invention, microporous fins, e.g., made of carbon paper, carbon cloth, and/or porous metal, such as copper or aluminum, can be incorporated into an active material, such as compressed zeolite 13x adsorbent material, improving both the bulk vapor transport and heat transport in the adsorbent, active material. The microporous fins may be inserted and pressed vertically into the active material layer, such as shown in FIGS. 4A and 4B, or may be integrated horizontally into a fin-tube stack (not shown). Separate fins can extend both through and around the fin-tube stack. The microporous fins have a three-dimensional network of vapor transport channels, such as shown in FIGS. 4A and 4B.

Figure 5:
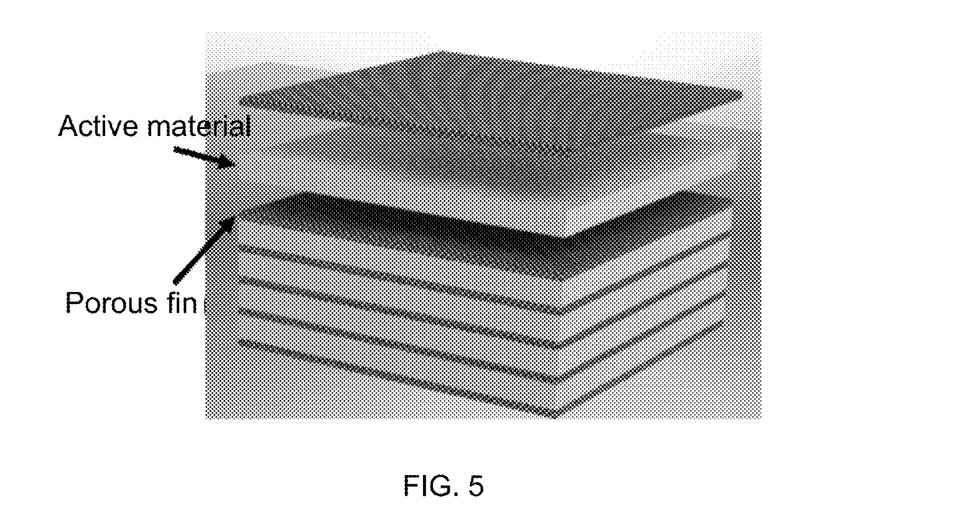
FIG. 5 schematically shows alternating layers of an active material and layers of a three-dimensional network formed according to embodiments of the present invention.

Similar to the process described above in FIG. 1, the three-dimensional network of vapor transport channels which may be filled with a polymer, such as a semirigid resin, e.g., Su-8 photoresist or PMMA, to help maintain the pore structure of the fin, and the polymer cured to form a cured three-dimensional network. By coating the microporous fins with polymethylmethacrylate (PMMA, as a solution in chlorobenzene, tuolene, or anisole) prior to the fins' integration in the active material, the vapor transport channels in the fin material can be filled with the polymer and preserved during any subsequent densification process, such as an hydraulic compression process. An active material layer may be placed on either side of the cured three-dimensional network in order to form a composite material with alternating layers of active material and cured three-dimensional network structure, such as shown in FIG. 5. For example, alternating layers of 500 μm copper mesh porous fins filled with PMMA and layers of the active material, such as zeolite, may be formed in a stack and compressed into one another in order to integrate the active material into the cured three-dimensional network. After the densification/compression process, the polymer is removed with a solvent, e.g., the photoresist may be removed using propylene glycol monomethyl ether acetate or the PMMA may be dissolved in acetone, leaving an open channel network in the fins for the transport of vapor or ions. This compressed stack may then be attached to a coolant tube for enhanced heat removal.

EXAMPLE

Hollow graphene transport channels were synthesized via a process having the following steps: 1) growing graphene on Ni-foam templates in an Ar—$CH_4$ atmosphere, 2) etching the Ni substrate in HCl, 3) wicking liquid PMMA (4% PMMA solid contents in anisol) into the center of the hollow graphene foam structure for about 10 minutes in order to let the PMMA wick into the hollow channels, 4) curing for about 30 minutes at 150° C. and repeating wicking and curing approximately 1-5 times (or more) in order to completely fill the inside of the graphene tubes with the PMMA, 5) wetting the cured three-dimensional graphene/PMMA structure with ethanol, 6) pouring Zeolite 13x (ZT, active material, the ZT powder as a suspension in water) into the cured three-dimensional graphene structure, 7) packing and compressing the zeolite 13x into the graphene foam structure using about 30-50M Pa in a hydraulic press for at least 10 min. (preferably in a die that is cut to the desired sample shape), 8) immersing the composite material in acetone to remove the PMMA, preferably overnight, refreshing the acetone 2-3 times, and 9) annealing the composite material at about 450° C. for about 3 hrs. under inert gas to fuse the materials together via contraction and to introduce defects into the graphene in order to enhance transport through the channel walls.

Figure 6:
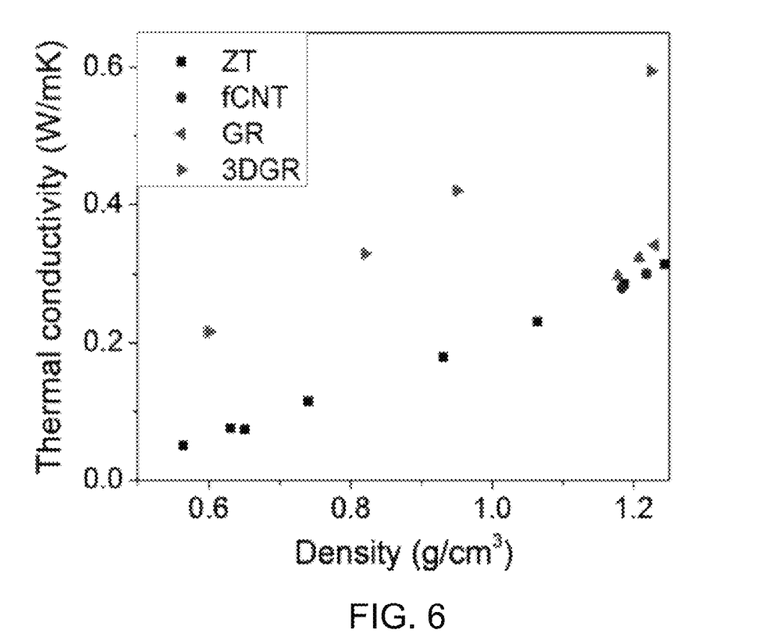
FIG. 6 is a graph showing thermal conductivity as a function of density for a variety of materials, including a composite material (designated 3DGR) formed according to embodiments of the present invention.
Figure 7:
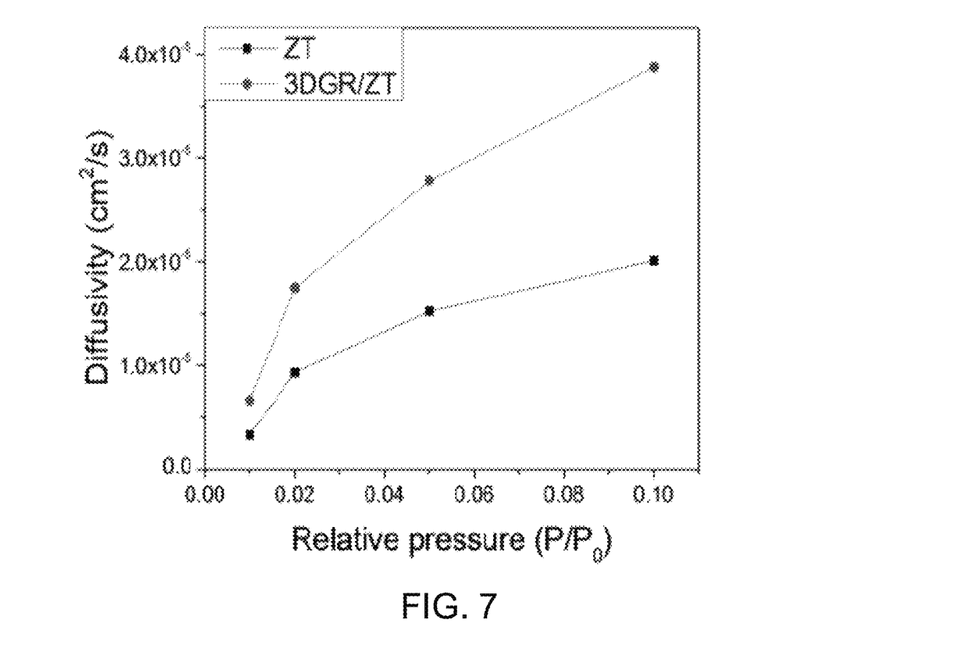
FIG. 7 is a graph showing mass transfer characteristics of an active material without integrated graphene (designated ZT) and an active material with integrated graphene (designated 3DGR/ZT) formed according to embodiments of the present invention.

FIG. 6 shows the heat transfer characteristics of pure zeolite 13x samples (designated ZT), functionalized carbon nanotubes (designated fCNT), and graphene (designated GR) compared to three-dimensional graphene (designated 3DGR). FIG. 7 shows the mass transfer characteristics of pure zeolite 13x samples (designated ZT) compared to three-dimensional graphene (designated 3DGR).

Figure 8:
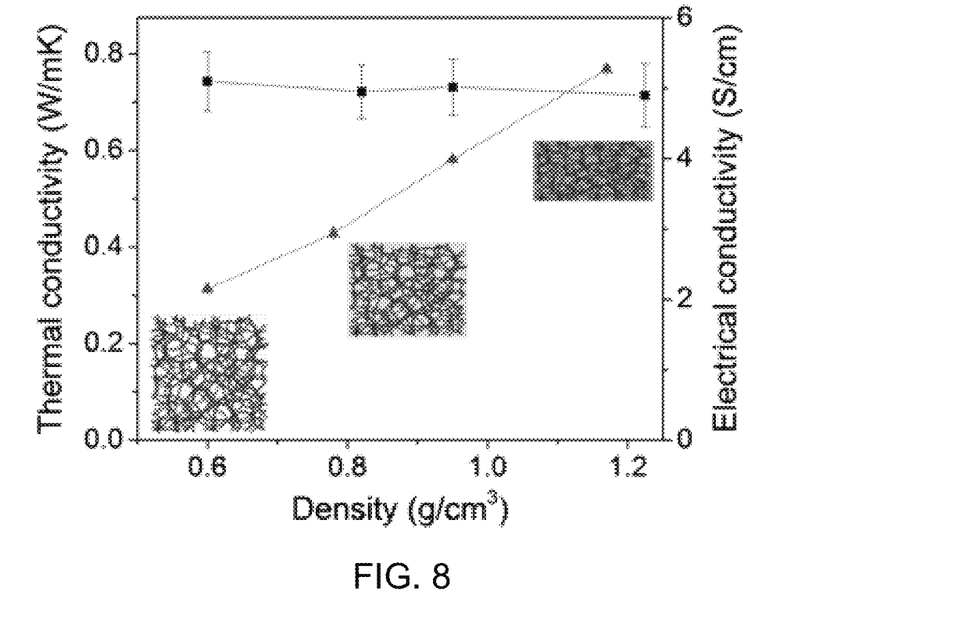
FIG. 8 is a graph showing thermal conductivity and electrical conductivity as a function of density for a composite material formed according to embodiments of the present invention.
Figure 9:
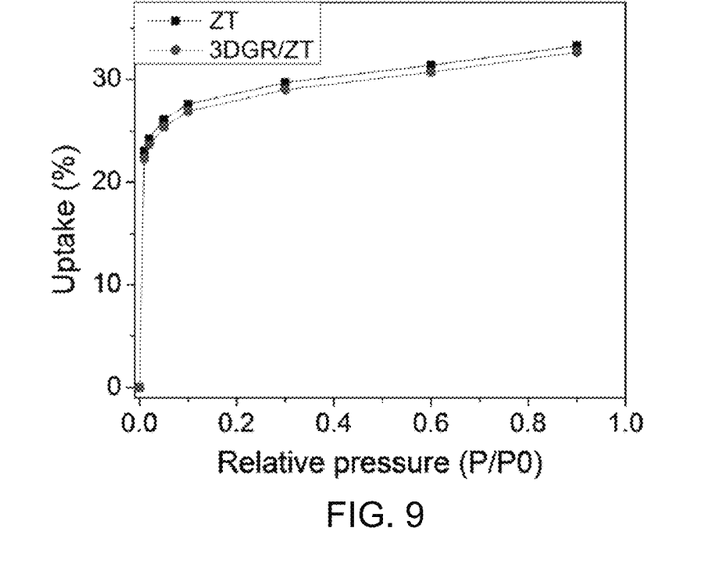
FIG. 9 is a graph showing water vapor uptake as a function of pressure for an active material without integrated graphene (designated ZT) and an active material with integrated graphene (designated 3DGR/ZT) formed according to embodiments of the present invention.
Figure 10:
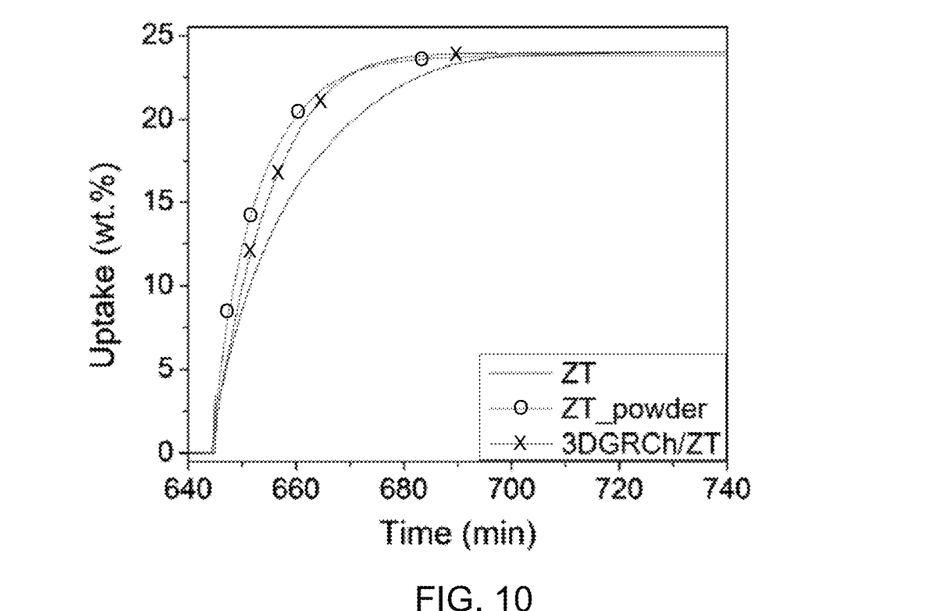
FIG. 10 is a graph showing water vapor uptake as a function of time for an active material without integrated graphene (designated ZT) and an active material with integrated graphene (designated 3DGRCh/ZT) formed according to embodiments of the present invention.
Figure 11:
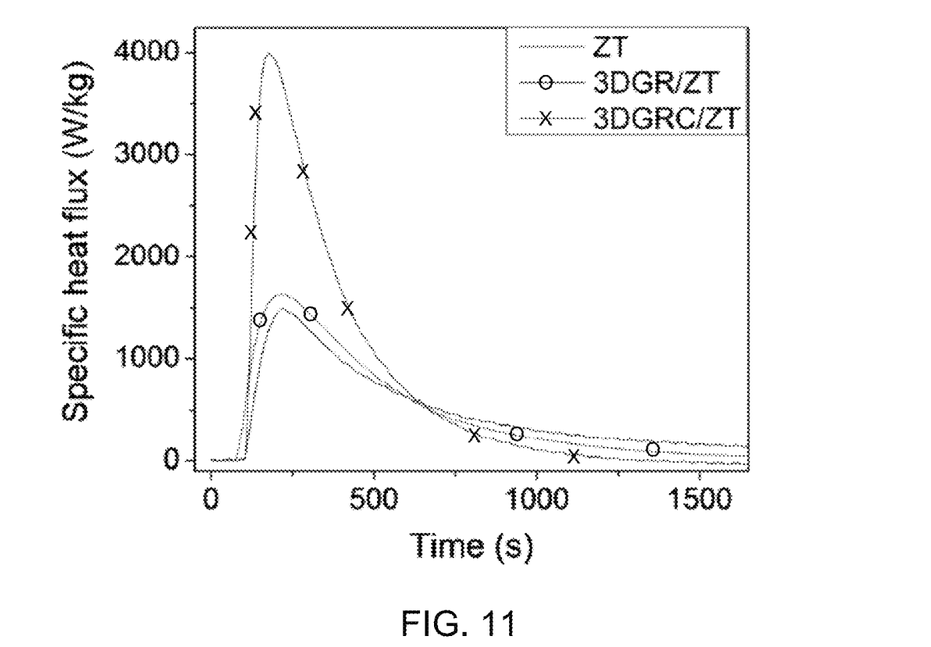
FIG. 11 is a graph showing heat flux for samples placed in a vacuum chamber and exposed to a vapor pressure spike to ~2000 Pa $H_2O$ for an active material without integrated graphene (designated ZT), an active material with integrated graphene (designated 3DGR/ZT), and an active material with integrated graphene after densification (designated 3DGRC/ZT) formed according to embodiments of the present invention.

FIG. 8 shows the densification of a composite 3D graphene-ZT material subsequent to the ZT integration but prior to the removal of the PMMA or annealing steps. Thermal and electrical conductivity measurements taken for different densities indicate that the carbon nanomaterial remains percolated throughout the entire sample at all the densities tested. FIGS. 9-11 show experimental results on the transport enhancement provided by the zeolite integration of the 3D graphene channels (3DGRC) composite material. Specifically, FIG. 9 shows the water vapor uptake of zeolite (ZT) samples with and without integrated graphene channel networks, showing that the inclusion of graphene channels does not reduce the total uptake capacity of the ZT material. FIG. 10 shows the water vapor uptake of ZT samples, with and without integrated graphene channel networks, versus time, showing that the inclusion of graphene channels serves to decrease the response time of packed ZT samples by enhancing mass and heat transport. FIG. 11 shows the heat flux from an active material without integrated graphene (designated ZT), an active material with integrated graphene (designated 3DGR/ZT), and an active material with integrated graphene after densification (designated 3DGRC/ZT), which were placed in a vacuum chamber and exposed to a vapor pressure spike to ~2000 Pa $H_2O$. The fast response time of the sample with integrated hollow graphene channels (3DGRC) is largely due to the mass transport enhancement that the graphene provides. The modest enhancement with the non-hollow graphene networks (3DGR) is likely due to heat transport enhancement alone.

Although the above discussion discloses various exemplary embodiments of the invention, it should be apparent that those skilled in the art may make various modifications that will achieve some of the advantages of the invention without departing from the true scope of the invention.

What is claimed is:

1. A method of forming a composite material for use in multi-modal transport, the method comprising:
   providing three-dimensional graphene having hollow channels, the hollow channels distributed throughout all of the three-dimensional graphene;
   enabling a polymer solution to wick into the hollow channels of the three-dimensional graphene;
   curing the polymer solution to form a cured three-dimensional graphene, the cured three-dimensional graphene including a polymer within the hollow channels;

integrating an active material within open areas around the hollow channels, the open areas distributed throughout all of the cured three-dimensional graphene; and after integrating the active material, removing the polymer from within the hollow channels to form the composite material.

2. The method of claim 1, wherein the polymer includes polymethylmethacrylate.

3. The method of claim 1, wherein the active material includes zeolite.

4. The method of claim 1, wherein the active material is a powder within a liquid suspension and integrating the active material within the open areas includes integrating the suspension within the open areas around the hollow channels.

5. The method of claim 1, further comprising
wetting the cured three-dimensional graphene with an integration promoter before integrating the active material in order to promote integration of the active material within the open areas.

6. The method of claim 5, wherein the active material includes zeolite and the integration promoter includes ethanol.

7. The method of claim 1, further comprising:
densifying the active material around the hollow channels and the cured three-dimensional graphene before removing the polymer from within the hollow channels.

8. The method of claim 1, wherein removing the polymer includes immersing the active material and the cured three-dimensional graphene in a solvent.

9. The method of claim 8, wherein the polymer includes polymethylmethacrylate and the solvent includes acetone.

10. The method of claim 1, further comprising:
annealing the composite material after removing the polymer from within the hollow channels in order to promote contact between the active material and the three-dimensional graphene.

11. The method of claim 1, wherein enabling the polymer solution to wick into the hollow channels includes placing one side of the three-dimensional graphene in the polymer solution and permitting the polymer solution to enter the hollow channels by capillary action.

12. The method of claim 1, wherein the steps of enabling and curing are repeated in order to substantially fill the hollow channels with the polymer.

13. A method of forming a composite material for use in multi-modal transport, the method comprising:
providing a three-dimensional network of vapor transport channels, the vapor transport channels distributed throughout all of the three-dimensional network;
enabling a polymer solution to enter into the vapor transport channels;
curing the polymer solution to form a cured three-dimensional network, the cured three-dimensional network including a polymer within the vapor transport channels;
integrating an active material around the vapor transport channels, the active material distributed throughout all of the cured three-dimensional network; and
after integrating the active material, removing the polymer from within the vapor transport channels to form the composite material.

14. The method of claim 13, wherein integrating the active material around the vapor transport channels includes placing a layer of the active material on either side of the cured three-dimensional network.

* * * * *